Nov. 3, 1959  O. K. DOYLE  2,911,000
FLUSH TANK VALVE
Filed Sept. 4, 1956  2 Sheets-Sheet 1
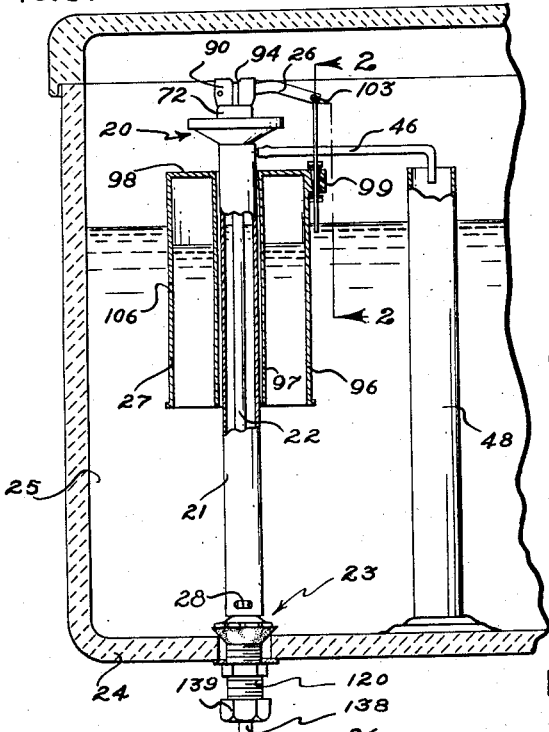
FIG. 1.
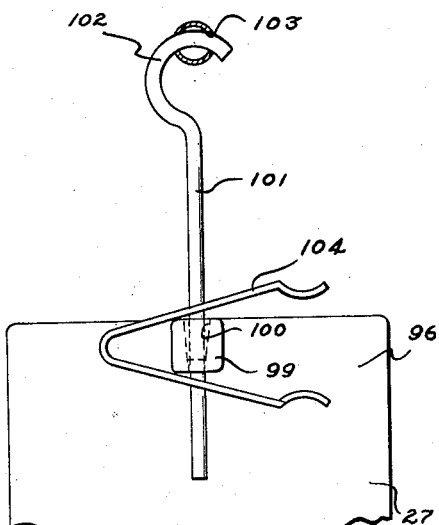
FIG. 2.
FIG. 11.
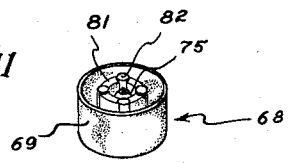
FIG. 12.
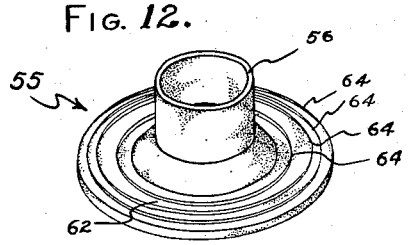
FIG. 13.
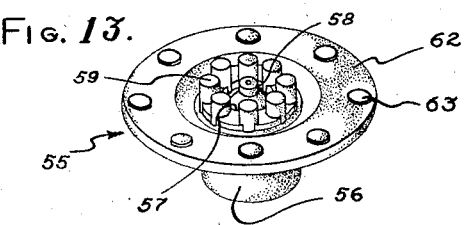
INVENTOR
ORVILLE K. DOYLE
BY HIS ATTORNEYS
HARRIS, KIECH, FOSTER & HARRIS Nov. 3, 1959     O. K. DOYLE     2,911,000
FLUSH TANK VALVE
Filed Sept. 4, 1956     2 Sheets-Sheet 2
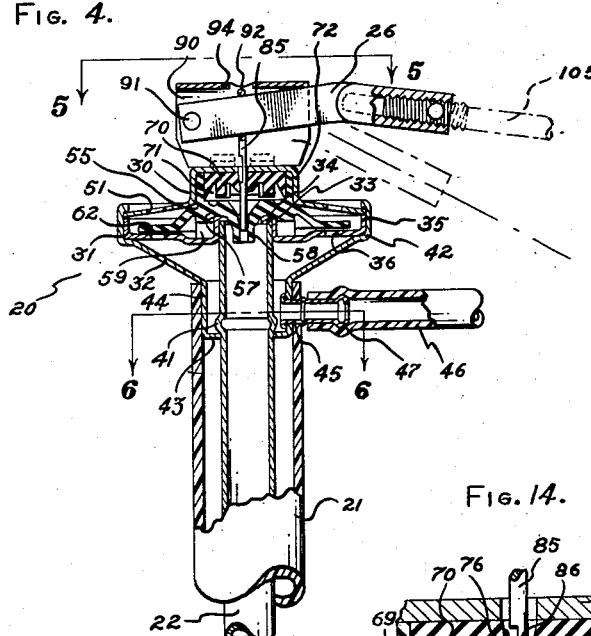
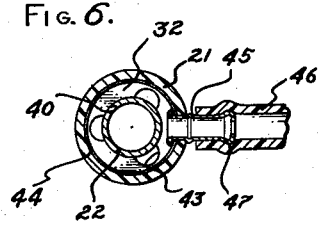
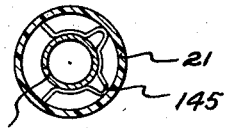
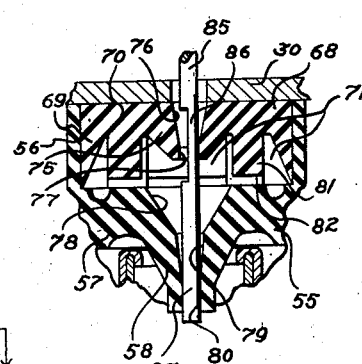
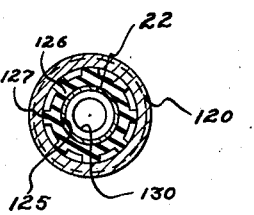
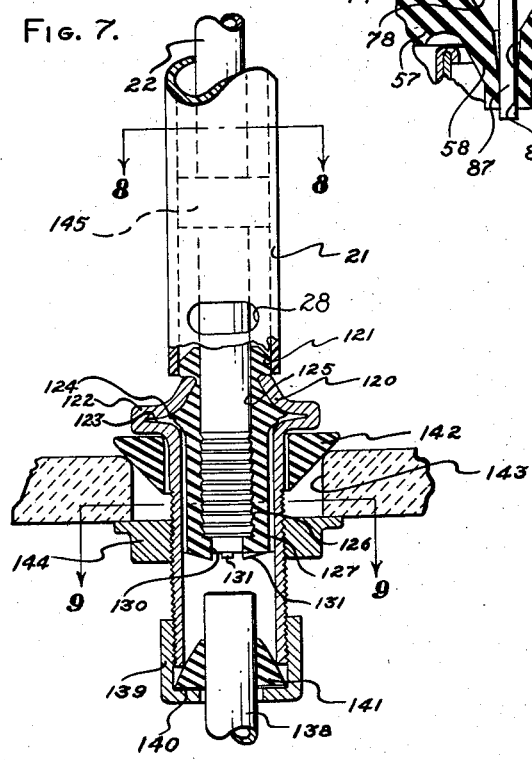
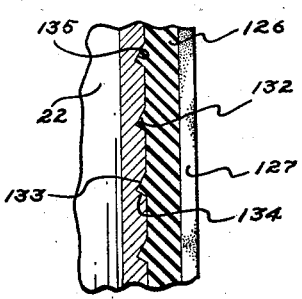
INVENTOR
ORVILLE K. DOYLE
BY HIS ATTORNEYS
HARRIS, KIECH, FOSTER & HARRIS

United States Patent Office 2,911,000
Patented Nov. 3, 1959

2,911,000

FLUSH TANK VALVE

Orville K. Doyle, Fullerton, Calif.

Application September 4, 1956, Serial No. 607,857

13 Claims. (Cl. 137—414)

This invention relates to ball cock valves for control of fluid flow, and, in particular, to a ball cock value suitable for use in a flush tank or the like. Although the preferred embodiment of my invention is shown and described as a ball cock valve suitable for use in a toilet flush tank, I do not intend to be limited to such application of the invention as it has other appropriate uses.

This application is a continuation-in-part of my copending application entitled Ball Cock Valve, Serial No. 537,640, filed September 30, 1955, now Patent No. 2,808,850 granted October 8, 1957.

It is an object of the invention to provide a ball cock valve which may be automatically actuated in response to some predetermined standard, such as the liquid level in a tank. It is another object of the invention to provide a ball cock valve in which the pressure of the inflowing fluid is utilized to move the shutoff means and regulate the flow of said incoming fluid. A further object of the invention is to provide such a valve in which the control thereof is independent of the pressure of the fluid.

Another object of the invention is to provide a valve in which a portion of the incoming fluid is channeled into a pressure chamber formed of a flexible, temporarily deformable material, the fluid under pressure exerting forces against the inner walls of the pressure chamber to make the chamber fluid tight, to hold the chamber in position, and to flex a wall of the chamber into engagement with a valve seat shutting off the flow of fluid through the valve. Another object of the invention is to provide such a valve in which fluid enters the pressure chamber through a first passage and exits through a second passage, the two passages being sealed and opened by a single rod engaging both passages. A further object of the invention is to provide such a valve in which the movement of the rod relative to the passages is independent of the pressure of the fluid being controlled and in which the rod is directly driven by a float or other quantity determining means.

It is another object of the invention to provide a valve in which the incoming fluid flows through an inlet pipe, over a valve seat and through an outlet chamber positioned around the inlet pipe with the outlet chamber having openings in the wall thereof adjacent the valve seat and with the pressure chamber having a flexible skirt extending therefrom into the outlet chamber so that the skirt may be flexed into contact with the wall of the outlet chamber to block the openings therein when fluid is flowing through the valve and to flex away from the wall of the outlet chamber when fluid flow is stopped in order to couple the outlet chamber with the surrounding atmosphere and prevent any siphoning action. Another object of the invention is to provide such a valve in which a single element acts to shut off fluid flow at the valve seat and to prevent siphoning when fluid pressure ceases.

It is a further object of the invention to provide a valve through which the fluid flows at a maximum rate for substantially the entire flow cycle, and yet in which the flow is shut off without producing hammer in the supply line. A further object of the invention is to provide such a valve in which the relative times of closing the exhaust passage and opening the inlet passage of the pressure chamber can be precisely controlled to give positive shutoff action.

Still another object of the invention is to provide a valve of the type described which is small, light in weight, inexpensive and easily fabricated from readily available materials, and one in which only three moving parts are required, thereby providing a long service life with minimum maintenance requirements.

It is another object of the invention to provide a valve which is quiet in operation, such quiet operation being achieved by providing flexible cushioning in the form of a flexible diaphragm positioned at the point of change in direction of flow of fluid at the valve seat and by providing an outlet pipe which is straight and which empties adjacent the bottom of the tank below the surface of the fluid in the tank.

Another object of the invention is to provide a float-actuated valve which requires very small forces for operation thereof, and one in which the float may be concentrically positioned around the valve and standpipe thereby requiring a minimum space for installation and operation.

It is a further object of the invention to provide a float for such a valve which may be either concentric with the standpipe or positioned to one side thereof and which has sides and top forming an air trapping enclosure with a small opening in a side adjacent the top. Another object of the invention is to provide such a float having an open bottom, so that a substantial amount of water will enter the float through the bottom when the tank is filling and so that water will flow out of the tank faster than it flows out of the float when the tank is emptying, thereby increasing the downward force on the float due to gravity which serves to open the valve and start the filling operation.

It is an object of the invention to provide a coupling for joining two pipes in axial alignment which is adapted for use in a flush tank or the like wherein one pipe is clamped to the coupling and the other pipe is slidingly inserted into a flexible portion of the coupling, with the latter pipe positioned within a thin walled tubular portion of the flexible material within a chamber inside the coupling so that pressure of the fluid being conducted acts on the thin walled section and clamps the latter pipe therein. Such a coupling permits the pipe to be inserted and removed when no fluid is being transmitted and permits the pipe to be rotated relative to the coupling for suitable orientation. A flush tank valve utilizing such a coupling may be removed and replaced in less than a minute, a tremendous reduction in time over previously known couplings.

A further object of the invention is to provide such a valve having a positive shutoff by employing fluid pressure as the shutoff medium whereby a positive seal is assured and whereby the greater the fluid pressure, the tighter the seal.

Another object of the invention is to minimize noise during operation of the valve, which I accomplish in part by providing a full supply line opening to fill the tank until the valve operates to shut off such supply line. By providing such full line opening during filling of the tank, the fill up rate is uniform and many times faster than with any conventional ball cocks known to me, and this is another object of the invention.

Still another object of the invention is to provide such a valve in which only a small mechanical force is required to close the valve, which avoids the necessity for the long lever arm and a large ball float required with conventional ball cocks.

The invention also comprises novel details of construction and novel combinations and arrangements of parts which will more fully appear in the course of the following description. The drawings merely show and the description merely describes preferred embodiments of the present invention which are given by way of illustration or example.

In the drawings, wherein like parts in different figures are designated by the same numerals:

Fig. 1 is a side view of a preferred embodiment of the invention, shown partly in section;

Fig. 2 is an enlarged sectional view taken along the line 2—2 of Fig. 1;

Fig. 3 is a view of a portion of Fig. 1 showing an alternative embodiment of the float mechanism;

Fig. 4 is an enlarged sectional view of a portion of Fig. 1 showing the valve mechanism of the invention;

Fig. 5 is a top view taken along the line 5—5 of Fig. 4;

Fig. 6 is a sectional view taken along the line 6—6 of Fig. 4;

Fig. 7 is an enlarged sectional view of a portion of the embodiment of Fig. 1 showing the coupling mechanism;

Fig. 8 is a sectional view taken along the line 8—8 of Fig. 7;

Fig. 9 is a sectional view taken along the line 9—9 of Fig. 7;

Fig. 10 is an enlarged view of a portion of Fig. 7;

Fig. 11 is an isometric view of the upper seal unit shown in an inverted position;

Fig. 12 is an isometric view of the lower seal unit;

Fig. 13 is an isometric view of the lower seal unit of Fig. 12, shown in an inverted position; and Fig. 14 is an enlarged view of a portion of Fig. 4 showing the valve in the open position.

In the embodiment illustrated in Fig. 1, the moving parts of the valve are mounted in an outlet chamber 20 which closes the upper ends of an outlet pipe 21 and an inlet pipe 22. The latter is positioned in a coupling 23 mounted in a bottom wall 24 of a tank 25. The valve is actuated as a function of the fluid level in the tank 25 by a lever 26 coupled to a float 27 located within the tank. The lower end of the outlet pipe 21 may slidingly engage the top of the coupling 23, the pipe having one or more openings 28 in the wall thereof permitting fluid flow out into the tank.

The outlet chamber 20 includes an upper member 30, and intermediate member 31 and a lower member 32 (Fig. 4), the outlet chamber providing the fluid flow passages between the inlet pipe 22 and the outlet pipe 21. A rim 33 of a central opening in the intermediate member 31 is crimped over the top end of the inlet pipe 22 so as to fix the intermediate member 31 to the inlet pipe 22 and to provide a valve seat 34 at the open upper end of inlet pipe, the fluid controlled by the valve flowing upward through the inlet pipe, over the valve seat and into the outlet chamber. The periphery of the intermediate member 31 is turned up to form a flange 35 and a plurality of openings 36 are provided between the rim 33 and flange 35.

A central opening 40 (Fig. 6) in the lower member 32 of the outlet chamber 20 permits the lower member to slide upward over the inlet pipe 22 coming to rest against a bead 41 (Fig. 4) formed in the inlet pipe, a flange 42 of the lower member 32 simultaneously engaging the flange 35 of the intermediate member 31. Three openings 43 are provided in the lower member 32 adjacent the central opening 40 permitting fluid flow from the chamber 20 into the outlet pipe 21 along the outside of the inlet pipe 22. A cylindrical body portion 44 of the lower member 32 is so dimensioned as to be a sliding fit for the outlet pipe 21, the outlet pipe and lower body member being held together by a tubular rivet 45. One end of a refill tube 46 is mounted over a flared or serrated end 47 of the tubular rivet 45, the other end of the refill pipe being positioned in the mouth of an overflow pipe 48.

The upper member 30 is positioned within the flange 42 of the lower member resting on the flange 35 of the intermediate member, after which the upper edge of the flange 42 may be spun over to clamp the three members together. A plurality of openings 51 is provided in the upper member providing communication between the outlet chamber and the surrounding atmosphere. Thus it is seen that while the upper and lower members 30, 32 define the outlet chamber 20, the intermediate member 31 provides a means for rigidly mounting the outlet chamber to the inlet pipe and also serves as a valve seat.

A lower seal unit 55 (Figs. 12 and 13), including a cylindrical wall 56, a flexible wall or diaphragm 57 adjoining the lower edges of the wall 56, and a boss 58 extending downward from the central portion of the diaphragm, is positioned in the outlet chamber between the upper and intermediate members thereof (Fig. 4). Spaced bosses 59 extend downward from the edge of the diaphragm 57 and rest on the intermediate member 31 to space the diaphragm from the valve seat when the diaphragm is in the rest or valve open position. Fluid flow through the valve is blocked by engagement of the diaphragm 57 with the valve seat 34 as shown in Fig. 4. The bosses 59 also prevent excessive downward flexing of the diaphragm 57 when the valve is operated at high fluid pressures. If desired, the components may be dimensioned so that the diaphragm 57 engages the valve seat 34 when at rest, the unit then functioning as a check valve as well as an anti-siphon valve.

A skirt 62 projects out from the edge of the diaphragm into the outlet chamber 20, the boss 58 being positioned within the inlet pipe 22. When in its rest position, the skirt 62 lies close to the top of the intermediate member 31 and is spaced therefrom by short bosses 63 extending downward from the skirt, thereby preventing blocking of the openings 36 in the intermediate member and preventing the skirt 62 from acting as a check valve. If desired, the bosses 63 may be omitted in some applications of the valve.

The lower seal unit is made of a flexible, temporarily deformable material such as rubber so that the diaphragm 57 may be displaced from its rest position to a position engaging the valve seat blocking flow of fluid from the inlet pipe to the outlet chamber. The flow of fluid from the inlet pipe through the outlet chamber and to the outlet pipe deflects the skirt 62 of the flexible lower seal unit 55 into contact with the upper member 30 of the outlet chamber 20 to prevent flow of fluid through the openings 51 in the upper member. When flow of fluid ceases, the skirt returns to its normal or rest position, permitting air to enter the outlet chamber through the openings 51 to prevent siphoning of fluid up the outlet pipe. Circular ridges 64 are provided on the upper surface of the skirt 62 to insure sealing engagement between the skirt and the upper member.

An upper seal unit 68 (Fig. 11) comprising a cylindrical wall 69 and a flat portion or plate 70 adjoining the upper end of the wall 69 is telescopingly positioned within the lower seal unit 55, forming a pressure chamber 71 therebetween (Fig. 4) which is contained within a cylindrical section 72 of the upper member 30 of the outlet chamber 20. A boss 75 having a two-section opening 76, 77 therein coaxial with a three-section opening 78, 79, 80 in the boss 58 (Fig. 14) extends into the pressure chamber 71 from the plate 70. A tubular section 81 having short bosses 82 at the lower end thereof, extends downward from the plate 70 concentric with the boss 75. The upper seal unit 68 may be made of the same flexible, temporarily deformable material as the lower seal unit.

A rod 85 (Figs. 4 and 14) extends through the aligned openings in the upper and lower seal units, the rod having a central portion 86 and an end portion 87. The cross-sectional areas of the central portion 86 is less than the cross-sectional area of the end portion 87, the latter portion being shaped and dimensioned so that it is a tight, sliding fit in the openings 77 and 80. The reduced cross-sectional area of the central portion 86 may be formed in various ways, such as by dimpling the rod at one or more spots around its circumference, or by rolling or forming a circumferential groove, or by notching the rod as shown in Fig. 14.

A cap 90 having a shape of an inverted U, is carried on top of the upper member 30 (Figs. 4 and 5). One end of the lever 26 is pivotally mounted in the cap by a pin 91, the end of the lever being flattened so that the parallel walls of the cap serve as guides for vertical movement of the lever. The rod 85 passes through an opening in the top of the upper member 30 and is provided with a rectangular loop 92 at the upper end thereof through which the lever 26 passes, the loop 92 of the rod being guided by vertically extending grooves 93 formed in the parallel walls of the cap 90. An opening 94 is provided in the top of the cap 90 so that the rod 85 may be inserted therethrough prior to engagement of the rod with the lever 26.

The rod 85 is moved vertically through the seal units by the float 27 which is coupled to the lever 26. In Fig. 1, the float 27 which consists of closed sides 96, 97 and top 98 and an open bottom is positioned concentrically around the outlet pipe 21, the latter serving as a guide for the vertical movement of the float. A boss 99 projects outward from the side 96 of the float and has a tapered opening 100 therein. The upper end of a shaft 101 is formed in a loop 102 which is positioned in an opening 103 in the lever 26, the other end of the shaft 101 passing through the tapered opening 100 in the boss 99. The float is adjustably fixed to the shaft 101 by a spring clip 104 which has opposed openings therein through which the shaft is passed before and after passing through the tapered opening 100 of the float, the shaft being freed for movement through the tapered opening by manually pressing the ends of the clip 104 together (Fig. 2).

Although the preferred form of the float has been described above in conjunction with Fig. 1, it is contemplated that floats similar to the float 27 may be utilized which are spaced from the outlet pipe 21 and also that the conventional hollow spherical float may be substituted, a shaft 105 for carrying such a float being shown in phantom threaded into the lever 26 of Fig. 4.

It has been found that the provision of a small opening 106 (Fig. 1) in the side 96 of the float 27 produces a considerable improvement in the operation of the valve mechanism. As the tank is being filled with fluid, a portion of the air trapped within the float will escape through the opening 106, thereby permitting a larger amount of fluid to enter the float than would enter if no opening were provided. When the tank is being emptied, the fluid level in the tank will drop more rapidly than will the fluid level within the float because of the small size of the opening 106. The fluid thus trapped within the float will increase the downward force due to gravity acting upon the float to a considerable degree and thus make the operation of the valve more positive and rapid and permit the float itself to be manufactured of a thin light weight material such as a plastic molding. It is clear that more than one opening similar to the opening 106 may be included in the sides of the float, the requirement for proper operation being that the rate of flow through the opening or openings 106 be low enough so that the fluid level outside the float drops more rapidly than the fluid level within the float; or stated differently, the area of the opening 106 should be small relative to the horizontal area of the float.

As fluid flows into the tank 25, the float 27 will move upward and move the rod 85 upward from the position shown in Fig. 14 until the end 87 of the rod is moved out of the lower opening 80 of the boss 58. Then a portion of the fluid which is flowing upward through the inlet pipe will flow through the opening 80, around the end 87 of the rod and into the pressure chamber 71. The end of the rod will now be blocking the opening 77 of the boss 75 of the upper seal unit 68, thus preventing flow of fluid out of the pressure chamber. The diaphragm 57 of the lower seal unit 55 will be flexed downward by the fluid within the pressure chamber until the diaphragm contacts the valve seat 34 shutting off flow of fluid from the inlet pipe to the outlet chamber. Thus the time of shutoff is controlled by the position of the rod which is coupled to the float and is independent of the pressure of the fluid.

When the tank is being emptied, the rod 85 will be moved downward by the float with the end of the rod moving out of the opening 77 in the boss 75 of the upper seal unit, thereby permitting fluid to flow out of the pressure chamber around the central portion 86 of the rod. Then the diaphragm 57 will move upward to its normal position and permit flow of fluid from the inlet pipe to the outlet chamber. The end 87 of the rod will now be blocking the flow of fluid through the opening 80 of the boss 58 so that no fluid enters the pressure chamber while the tank is being filled. The bosses 82 which extend downward from the plate 70 prevent the pressure chamber 71 from being collapsed by the pressure of the flowing fluid on the lower surface of the diaphragm, provide for communication between all portions of the pressure chamber and also serve to maintain the opening between the diaphragm and the valve seat constant during the filling operation.

The portion of the boss 58 of the lower seal unit 55 having the opening 80 therein has thin walls and extends downward into the inlet pipe 22. The opening 80 is also quite short axially in comparison to the openings 78 and 79. The pressure of the fluid in the inlet pipe 22 produces a tight seal between the lower end of the boss 58 and 87 of the rod when the latter is in the opening 80; however, the short length of the opening 80 produces very little sliding friction tending to prevent upward motion of the rod. The lower end of the boss 75 of the upper seal unit 68 is similarly constructed to provide similar operating characteristics. When fluid flows into the pressure chamber 71 through the opening 80 and the end 87 of the rod 85 is blocking the opening 77 of the boss 75, the pressure of the fluid in the pressure chamber 71 seals the upper and lower seal unit together, seals the lower end of the boss 75 against the rod end 87 and moves the diaphragm 57 down against the valve seat. Since the rod 85 is moved through the openings 77 and 80 by the action of the float, the possibility of the openings being jammed by dirt or other particles is eliminated.

An alternative form for a float for actuating the valve of the invention is shown in Fig. 3. Therein, a float 110 is concentrically positioned about the outlet pipe 21 in the same maner as the float 27 of Fig. 1. The float is totally enclosed, having a top 111, a bottom 112 and sides 113, 114 with a small opening 115 in the side 113 between the top and bottom thereof. The float 110 is coupled to the lever 26 by a link 116, one end of which engages the opening 103 in the lever 26 and the other end of which engages a loop 117 mounted on the top of the float.

In Fig. 3, the valve is shown in the off position with the tank filled, the lower portion of the float 110 also being filled by the fluid in the tank. The float is supported by the air trapped in the upper portion thereof while the liquid in the lower portion of the float does not contribute to the mass being supported by the trapped air, since the fluid may flow freely in and out through the opening 115. When the tank is emptied and the fluid level drops below the opening 115, the fluid in the float below the opening 115 is trapped therein and serves as a weight to insure positive action of the valve mechanism.

The coupling 23 includes a tube 120 of a relatively rigid material such as brass or the like, and a resilient member 121 carried at one end of the tube 120 (Figs. 1 and 7). A circumferential flange 122 adjacent the upper end of the tube 120 may be provided with flat surfaces which serve as gripping surfaces for a wrench. An internal circumferential groove 123 is also provided adjacent the upper end of the tube, the groove 123 preferably coinciding with the flange 122 for structural reasons. A flexible lip 124 extends outward from the resilient member 121 into the groove 123 and may be flexed upward to engage the upper wall of the groove.

An opening 125 in the resilient member 121 coaxial with the tube 120 slidingly receives the lower end of the inlet pipe 22, the resilient member including a relatively thin walled tubular portion 126 projecting into the tube 120 toward the lower end thereof and spaced therefrom by axial ribs 127 (Fig. 9).

An opening 130 in the lower end of the resilient member 121 is smaller in diameter than the opening 125 and serves as a stop to limit the movement of the inlet pipe 22 (Fig. 7). Ribs 131 extend axially from the lower end of the resilient member and act as spaces preventing sealing engagement between the resilient member and any object resting against the lower end thereof.

A number of spaced ridges 132 are formed on a portion of the wall of the opening 125 in the resilient member 121 with the slope of the upper faces 133 of the ridges substantially less than the slope of the lower faces 134 relative to the vertical wall of the opening (Figs. 7 and 10). In the embodiment shown herein the upper slope is about thirty degrees and the lower slope is about sixty degrees. A number of spaced grooves 135 are formed in the lower end of the inlet pipe 22, corresponding to the ridges 132 in slope and location. A pipe 138 may be clamped to the lower end of the tube 120 by a threaded cap 139, a washer 140 and a resilient washer 141 so that when the cap 139 is screwed onto the tube 120, the resilient washer 140 will be compressed around the pipe 138 to clamp it in position. The ribs 131 prevent the end of the pipe 138 from sealingly engaging the resilient member so that when fluid is flowing in the pipe 138, the fluid will fill the interior of the tube 120.

When fluid is flowing through the pipe 138, the coupling 23 and the inlet pipe 22, the fluid within the tube 120 will press the thin walled portion 126 of the resilient member 121 against the inlet pipe 22 and prevent removal of the inlet pipe from the resilient member by the forces acting thereon due to the upward flowing fluid. The fluid will also flow between the ribs 127 into the groove 123 and force the lip 124 against the upper wall of the groove preventing leakage out of the coupling. However, when there is no fluid within the coupling, the inlet pipe may be manually removed from, inserted into or rotated in the resilient member. The mating ridges 132 and grooves 135 facilitate insertion of the pipe but increase the retaining forces.

When installing the coupling in a flush tank or the like, the tube 120 and a resilient washer 142 are inserted through an opening 143 in the bottom wall 24 of the tank and are clamped in place by a nut 144 threaded on the tube 120 and engaging the bottom of the wall 24. The pipe 138 is next clamped to the tube as described above. Then the inlet pipe 22 of the valve is inserted into the resilient member 121 and rotated to the desired operating position, the lower end of the outlet pipe 21 being spaced about the inlet pipe by a clip 145 (Figs. 7 and 8). This type of coupling provides a shock mounting for the valve, substantially reducing the transmission of noise and vibration between the valve and the tank. The coupling also provides electrical insulation between the valve and other metal parts, thus eliminating electrolytic action and its deleterious effects upon the structure. Such a coupling permits the valve of a flush tank to be removed and replaced in less than thirty seconds, this replacement being accomplished without leakage of the residual liquid in the tank onto the floor since the coupling is not disturbed.

The resilient member 121 may be molded in the tube 120 of the coupling, or the resilient member may be formed separately and inserted into the finished tube which has been formed by upsetting a length of cylindrical pipe.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In a float-controlled valve for controlling the fluid level in a tank having a fluid inlet pipe, the combination of: valve means adapted to be mounted on the inlet pipe for controlling flow of fluid from the inlet pipe; lever means movable in a substantially vertical plane; means coupling said lever means to said valve means so that movement of said lever means actuates said valve means; a float movable vertically relative to the inlet pipe, said float including means defining sides and a top and having at least one opening in said sides spaced from said top, said opening being small relative to the horizontal area of said float; and means coupling said float to said lever means in driving relationship.

2. In a float-controlled valve for controlling the fluid level in a tank having a fluid inlet pipe, the combination of: valve means adapted to be mounted on the inlet pipe for controlling flow of fluid from the inlet pipe; lever means movable in a substantially vertical plane; means coupling said lever means to said valve means so that movement of said lever means actuates said valve means; a float movable vertically relative to the inlet pipe, said float having closed sides and top and an open bottom, said float having at least one opening in said closed sides located between said top and bottom, said opening being small relative to said open bottom; and means coupling said float to said lever means in driving relationship.

3. In a float-controlled valve for controlling the fluid level in a tank having a fluid inlet pipe, the combination of: valve means adapted to be mounted on the inlet pipe for controlling flow of fluid from the inlet pipe; lever means movable in a substantially vertical plane; means coupling said lever means to said valve means so that movement of said lever means actuates said valve means; a hollow float movable vertically relative to the inlet pipe, said float including means defining sides, top and bottom thereof and having at least one opening in said sides located between said top and bottom, said opening being small relative to the horizontal area of said float; and means coupling said float to said lever means in driving relationship.

4. In a valve for controlling the flow of a fluid, the combination of: an inlet pipe providing a source of the fluid; an outlet chamber positioned around one end of said inlet pipe and providing for flow of the fluid away from said one end; a valve seat positioned between said inlet pipe and said outlet chamber, said outlet chamber having at least one opening in the wall thereof communicating with the surrounding atmosphere; means defining a pressure chamber, said means having a flexible wall so positioned that when flexed in one direction it will engage said valve seat to block flow of fluid between said inlet pipe and said outlet chamber, said means including a first flow passage from said inlet pipe to said pressure chamber and a second flow passage from said pressure chamber to an exhaust; a flexible skirt carried by said means and projecting into said outlet chamber around said one end of said inlet pipe, said skirt being deflectable against said wall of said outlet chamber by the flow of fluid from said inlet pipe to said outlet chamber to block said opening; rod means slidably positioned in said second flow passage and engageable with said first flow passage; and means for moving said rod means to block said first flow passage and to open said second flow passage.

5. In a valve for controlling the flow of a fluid, the combination of: an inlet pipe providing a source of the fluid; an outlet chamber positioned around one end of said inlet pipe and providing for flow of the fluid away from said one end; a valve seat positioned between said inlet pipe and said outlet chamber, said outlet chamber having at least one opening in the wall thereof communicating with the surrounding atmosphere; means defining a pressure chamber, said means having a flexible wall so positioned that when flexed in one direction it will engage said valve seat to block flow of fluid between said inlet pipe and said outlet chamber; a flexible skirt carried by said means and projecting into said outlet chamber around said one end of said inlet pipe, said skirt being deflectable against said wall of said outlet chamber by the flow of fluid from said inlet pipe to said outlet chamber to block said opening; and means for introducing fluid into said pressure chamber and for exhausting fluid from said pressure chamber to move said flexible wall toward and away from said valve seat.

6. In a valve for controlling the flow of a fluid, the combination of: an inlet pipe providing a source of the fluid; an outlet chamber positioned around one end of said inlet pipe and providing for flow of the fluid away from said one end; a valve seat positioned between said inlet pipe and said outlet chamber, said outlet chamber having at least one opening in the wall thereof communicating with the surrounding atmosphere; means defining a pressure chamber, said means having a first opening therein and having a flexible wall, said flexible wall having a second opening therein coaxial with said first opening, said first opening connecting said pressure chamber to an exhaust, said second opening connecting said pressure chamber with said inlet pipe; a flexible skirt carried by said means and projecting into said outlet chamber around said one end of said inlet pipe, said skirt being deflectable against said wall of said outlet chamber by the flow of fluid from said inlet pipe to said outlet chamber to block said opening in said wall of said outlet chamber; means for positioning said pressure chamber adjacent said valve seat so that said flexible wall when flexed in one direction, will engage said valve seat to block flow of fluid between said inlet pipe and said outlet chamber; a rod slidably positioned in said first opening and having an end engageable with said second opening, said engagement blocking flow of fluid through said second opening, said rod having a section of lesser cross-section area than said end, said section being positionable in said first opening when said end is engaged with said second opening for permitting flow of fluid through said first opening; and means for moving said rod axially in said first opening.

7. In a valve for controlling flow of a fluid, the combination of: inlet pipe means; outlet pipe means; a valve seat positioned between said inlet pipe means and said outlet pipe means; means defining a pressure chamber, said means having a first opening therein and having a flexible wall, said wall having a second opening therein, said wall being so positioned that when flexed in one direction it will engage said valve seat to block flow of fluid between said inlet pipe means and said outlet pipe means, said first opening connecting said pressure chamber to an exhaust, said second opening connecting said pressure chamber with said inlet pipe means; a plurality of spaced bosses mounted on said means defining a chamber and projecting into said chamber for limiting movement of said flexible wall toward the opposite wall of said chamber and away from said valve seat; a rod engageable with said first and second openings; and means for moving said rod to close said first opening when in one position and to close said second opening when in another position.

8. In a valve for controlling flow of a fluid, the combination of: inlet pipe means; outlet pipe means; a valve seat; a valve seat plate for rigidly positioning said valve seat between said inlet pipe means and said outlet pipe means; means defining a pressure chamber, said means having a first opening therein and having a flexible wall, said wall having a second opening therein, said wall being so positioned that when flexed in one direction it will engage said valve seat to block flow of fluid between said inlet pipe means and said outlet pipe means, said first opening connecting said pressure chamber to an exhaust, said second opening connecting said pressure chamber with said inlet pipe means; a plurality of spaced bosses mounted on said flexible wall and projecting outward therefrom engaging said valve seat plate and limiting movement of said flexible wall away from the opposite wall of said chamber; a rod engageable with said first and second openings; and means for moving said rod to close said first opening when in one position and to close said second opening when in another position.

9. A flexible seal for a valve having a housing enclosing a valve seat intermediate inlet and outlet lines with an antisiphon opening in the housing adjacent the valve seat, and having means for mounting said flexible seal in the housing, and having a valve rod movable through the valve for controlling flow of fluid therethrough, said flexible seal defining a pressure chamber within the housing and including three concentrically positioned, independently actuated sealing zones, the first of said zones comprising a central opening for engagement in sealing relation by said rod and providing communication between the pressure chamber and the inlet line when not so engaged, the second of said zones comprising a diaphragm which engages the valve seat upon expansion of the pressure chamber blocking fluid flow from the inlet line to the outlet line, and the third of said zones comprising a peripheral diaphragm which engages the housing blocking the antisiphon opening when fluid is flowing from the inlet line to the outline line.

10. In a valve having a housing enclosing a valve seat intermediate inlet and outlet lines with an opening in the housing adjacent the valve seat, the combination of: a seal unit positioned within the housing, said seal unit including a pressure chamber and a flap extending therefrom into the flow path between the inlet and the outlet lines, said flap being flexible to close said housing opening, a wall of said pressure chamber being flexible and engageable with the valve seat, said seal unit having aligned openings therein, one of said seal unit openings providing communication between said pressure chamber and an exhaust and the other of said seal unit openings providing communication between said pressure chamber and the inlet line; and shaft means engageable with said seal unit openings to close said one seal unit opening when in a first position permitting expansion of said pressure chamber for engaging said wall with the valve seat, and to open said one seal unit opening and close said other seal unit opening when in a second position permitting relaxation of said pressure chamber for disengaging said wall and valve seat.

11. In a valve having a housing enclosing a valve seat intermediate inlet and outlet lines with an opening in the housing adjacent the valve seat, the combination of: a first flexible seal telescopingly positioned in said housing; a second flexible seal telescopingly positioned in said first seal, said first and second seals defining a pressure chamber, one of said seals having a flap extending therefrom, said flap being positioned adjacent said housing opening and flexible to close same when fluid flows from the inlet line to the outlet line, one of said seals having a diaphragm positioned adjacent the valve seat and flexible to engage same for blocking flow of fluid from the inlet line to the outlet line, said pressure chamber having bosses on opposing walls thereof having aligned openings therethrough providing communication between said pressure chamber and the inlet line and an exhaust respectively;

and rod means slidably engageable with said pressure chamber openings for controlling flow of fluid into and out of said pressure chamber for expansion and relaxation, each of said bosses being sealed against said rod means by the fluid surrounding the boss.

12. In a float-controlled valve for controlling the fluid level in a tank having a fluid inlet pipe, the combination of: valve means adapted to be mounted on the inlet pipe for controlling flow of fluid from the inlet pipe; lever means movable in a substantially vertical plane; means for connecting said lever means to said valve means for concurrent movement of said lever means and said valve means so that said lever means actuates said valve means; a float movable vertically relative to the inlet pipe, said float including means defining sides and a top and having at least one opening in said sides spaced from said top, said opening being small relative to the horizontal area of said float; and means for connecting said float to said lever means for opening and closing of said valve means by said float.

13. In a float-controlled valve for controlling the fluid level in a tank having a fluid inlet pipe, the combination of: valve means adapted to be mounted on the inlet pipe for controlling flow of fluid from the inlet pipe; lever means movable in a substantially vertical plane; means for connecting said lever means to said valve means for concurrent movement of said lever means and said valve means so that said lever means actuates said valve means; a float movable vertically relative to the inlet pipe, said float having closed sides and top and an open bottom, said float having at least one opening in said closed sides located between said top and bottom, said opening being small relative to said open bottom; and means for connecting said float to said lever means for opening and closing of said valve means by said float.

References Cited in the file of this patent

UNITED STATES PATENTS

| | | |
|---|---|---|
| 561,441 | Schmidt | June 2, 1896 |
| 2,228,552 | Arbogast | Jan. 14, 1941 |
| 2,240,102 | Textor | Apr. 29, 1941 |
| 2,445,659 | Brown et al. | July 20, 1948 |
| 2,582,853 | Smith | Jan. 15, 1952 |
| 2,588,242 | Hunter | Mar. 4, 1952 |
| 2,756,769 | Martin et al. | July 31, 1956 |
| 2,808,850 | Doyle | Oct. 8, 1957 |
| 2,809,656 | Goldtrap | Oct. 15, 1957 |